US012187098B2

(12) United States Patent
Tanabe et al.

(10) Patent No.: US 12,187,098 B2
(45) Date of Patent: Jan. 7, 2025

(54) AIR CONDITIONER FOR ADJUSTING A TEMPERATURE OF A SEAT AND AN INTERIOR IN A VEHICLE

(71) Applicant: MITSUBISHI HEAVY INDUSTRIES THERMAL SYSTEMS, LTD., Tokyo (JP)

(72) Inventors: Hirotaka Tanabe, Tokyo (JP); Takayuki Kobayashi, Tokyo (JP); Hideaki Tatenoi, Tokyo (JP); Tomoki Hase, Tokyo (JP); Masahiro Ohta, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 206 days.

(21) Appl. No.: 17/911,092

(22) PCT Filed: Feb. 22, 2021

(86) PCT No.: PCT/JP2021/006619
§ 371 (c)(1),
(2) Date: Sep. 12, 2022

(87) PCT Pub. No.: WO2021/182094
PCT Pub. Date: Sep. 16, 2021

(65) Prior Publication Data
US 2023/0158859 A1 May 25, 2023

(30) Foreign Application Priority Data
Mar. 13, 2020 (JP) ................. 2020-043949

(51) Int. Cl.
*B60H 1/00* (2006.01)
*B60H 1/32* (2006.01)
*B60N 2/56* (2006.01)

(52) U.S. Cl.
CPC ..... *B60H 1/00885* (2013.01); *B60H 1/00285* (2013.01); *B60H 1/3216* (2013.01);
(Continued)

(58) Field of Classification Search
CPC ............ B60H 1/00285; B60H 1/00885; B60H 1/00899; B60H 1/32284;
(Continued)

(56) References Cited

U.S. PATENT DOCUMENTS 7,950,735 B2 * 5/2011 Major ................... B60N 2/5635
297/180.14
8,136,874 B2 * 3/2012 Negrini ................ B60N 2/5692
297/180.11
(Continued)

FOREIGN PATENT DOCUMENTS

JP          4677980 B2    4/2011
JP       2012-11929 A    1/2012
(Continued)

OTHER PUBLICATIONS

International Preliminary Report on Patentability and the Written Opinion of the International Searching Authority for International Application No. PCT/JP2021/006619, dated Sep. 22, 2022.
(Continued)

*Primary Examiner* — Orlando E Aviles
*Assistant Examiner* — Daniel C Comings
(74) *Attorney, Agent, or Firm* — Birch, Stewart, Kolasch & Birch, LLP

(57) ABSTRACT

A vehicle air conditioner includes: a refrigeration cycle in which a refrigerant circulates; a high-temperature cycle in which a first heat medium in liquid form heated by the refrigeration cycle circulates; a low-temperature cycle in which a second heat medium in liquid form cooled by the refrigeration cycle circulates; and a seat that is provided in
(Continued)

a vehicle interior and has a warm flow passage and a cold flow passage disposed close to each other. The warm flow passage is provided on the route of the high-temperature cycle, and the cold flow passage is provided on the route of the low-temperature cycle.

6 Claims, 9 Drawing Sheets

(52) U.S. Cl.
CPC ....... *B60H 1/32284* (2019.05); *B60N 2/5628* (2013.01); *B60N 2/5692* (2013.01); *B60H 2001/00928* (2013.01)

(58) Field of Classification Search
CPC ........... B60H 2001/00121; B60H 2001/00928; B60N 2/56; B60N 2/5614; B60N 2/5628; B60N 2/5692
USPC .......................................................... 62/261
See application file for complete search history.

(56) References Cited

U.S. PATENT DOCUMENTS

| | | | |
|---|---|---|---|
| 10,766,338 | B2 | 9/2020 | Fujii et al. |
| 2017/0129375 | A1 | 5/2017 | Zhang |
| 2017/0326949 | A1 | 11/2017 | Omi |
| 2018/0251008 | A1* | 9/2018 | Androulakis ........ B60N 2/5621 |
| 2021/0170827 | A1* | 6/2021 | Jeong ................. B60H 1/00907 |

FOREIGN PATENT DOCUMENTS

| | | | |
|---|---|---|---|
| JP | 2014-181574 A | 9/2014 |
| JP | 2017-523073 A | 8/2017 |
| JP | 2018-107931 A | 6/2018 |
| JP | 6558490 B2 | 8/2019 |

OTHER PUBLICATIONS

International Search Report for International Application No. PCT/JP2021/006619, dated May 11, 2021, with English translation.

\* cited by examiner

AIR CONDITIONER FOR ADJUSTING A TEMPERATURE OF A SEAT AND AN INTERIOR IN A VEHICLE

TECHNICAL FIELD

This disclosure relates to an air conditioner for a vehicle that can adjust the temperature of a seat provided in a vehicle interior.

BACKGROUND ART

Systems that can adjust the temperature of a seat in addition to that of an interior of a vehicle have been proposed.

For example, in Patent Literature 1, brine is cooled in a brine-refrigerant heat exchanger using evaporation latent heat of a combustible gas. In Patent Literature 1, this low-temperature brine is circulated through a heat exchanger for cooling including a seat installed in a vehicle interior to thereby enhance the comfort of the vehicle interior. Brine refers to water to which a component for lowering the freezing temperature has been added.

In Patent Literature 2, air of which the temperature has been adjusted is sent to an air chamber inside a seat through a seat air duct and a wind is blown out of a breathable seat to thereby enhance the comfort of an occupant sitting on the seat.

CITATION LIST

Patent Literature

Patent Literature 1: JP 4677960 B2
Patent Literature 2: JP 6558490 B2

SUMMARY OF INVENTION

Technical Problem

In the proposal of Patent Literature 1, due to the structure in which only a low-temperature brine circuit is connected to an interior heat exchanger, heating of a seat demanded in winter or in cold regions cannot be provided.

In the proposal of Patent Literature 2, due to a lack of the amount of accumulated heat of air of which the temperature is adjusted, comfort is immediately lost when getting into or out of the vehicle or when the device is stopped.

In view of the above, this disclosure aims to provide a vehicle air conditioner that, in addition to being able to cool and heat a seat, can easily maintain comfort when getting into or out of the vehicle or when the air conditioning device is stopped.

Solution to Problem

A vehicle air conditioner according to this disclosure includes: a refrigeration cycle in which a refrigerant circulates; a high-temperature cycle in which a first heat medium in liquid form heated by the refrigeration cycle circulates; a low-temperature cycle in which a second heat medium in liquid form cooled by the refrigeration cycle circulates; and a seat that is provided in a vehicle interior and has a warm flow passage and a cold flow passage disposed close to each other.

In the vehicle air conditioner according to this disclosure, the warm flow passage is provided on the route of the high-temperature cycle, and the cold flow passage is provided on the route of the low-temperature cycle.

Advantageous Effects of Invention

According to the vehicle air conditioner of this disclosure, the warm flow passage and the cold flow passage are disposed close to each other in the seat. The seat can be cooled and heated by adjusting the amounts of the first heat medium and the second heat medium flowing through the warm flow passage and the cold flow passage, respectively. Since the first heat medium and the second heat medium supplied to the warm flow passage and the cold flow passage, respectively, of the seat are in liquid form, comfort can be easily maintained when getting into or out of the vehicle or when the device is stopped.

DESCRIPTION OF EMBODIMENTS

A vehicle air conditioner 1 according to an embodiment will be described below with reference to the drawings.

The vehicle air conditioner 1 includes a refrigeration cycle 10 constituting a primary loop, and a high-temperature cycle HS and a low-temperature cycle CS that have flow passages independent from the refrigeration cycle 10 and constitute a secondary loop. Thus, comfort can be easily maintained when getting into or out of the vehicle or when the device is stopped, as well as a seat can be cooled and heated. In addition to being used to warm and cool a vehicle interior IN, the vehicle air conditioner 1 is used to heat and cool a seat provided in the vehicle interior IN. In the refrigeration cycle 10, a refrigerant R circulates. In the high-temperature cycle HS and the low-temperature cycle CS, a first heat medium HW and a second heat medium CW that are each in liquid form circulate.

[Overall Configuration]

Figure 1:
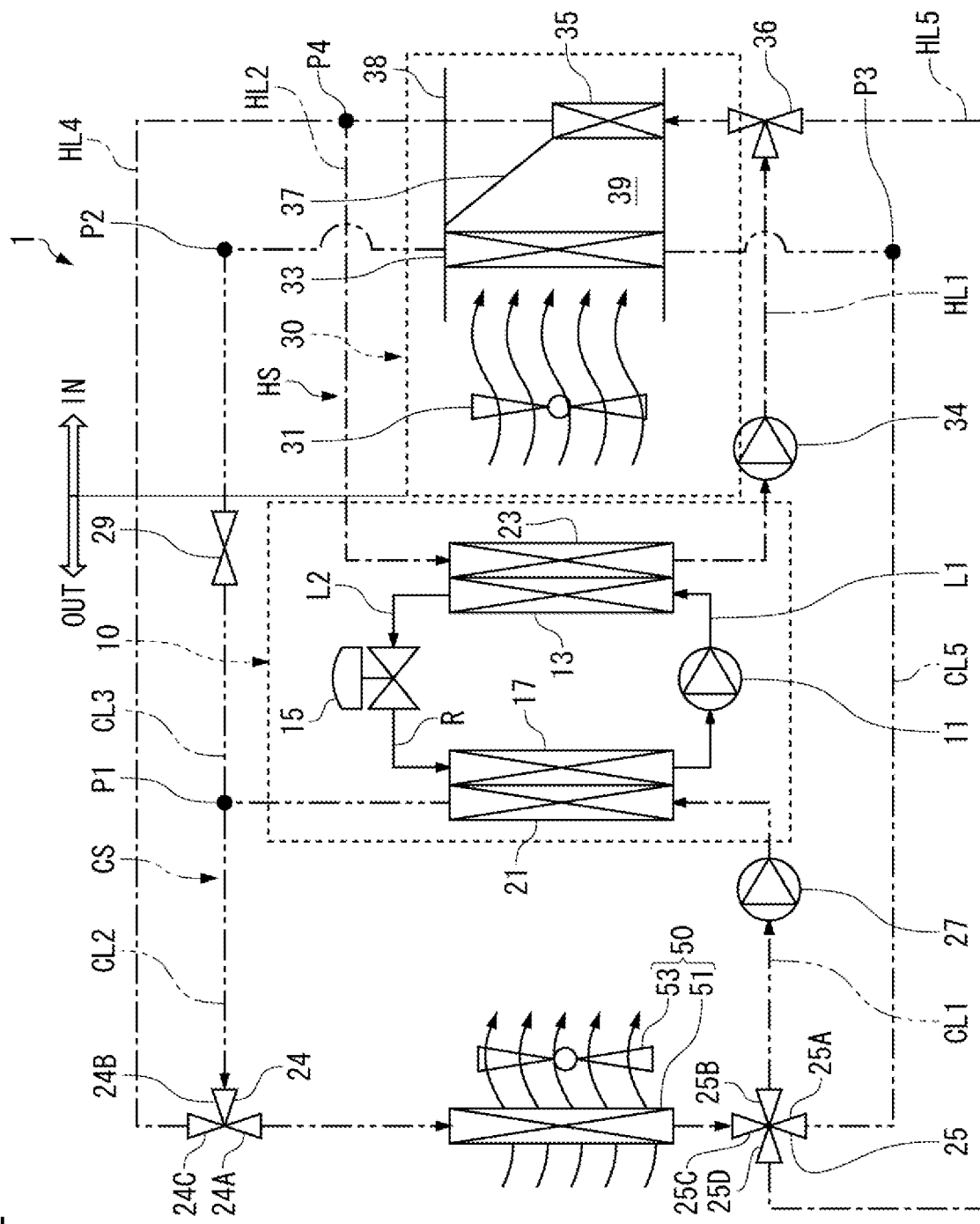
FIG. 1 is a circuit diagram showing the configuration of a vehicle air conditioner according to an embodiment of this disclosure.

As shown in FIG. 1, the vehicle air conditioner 1 includes the refrigeration cycle 10, a temperature adjustment mechanism 30 that is formed by a heating ventilation and air conditioning unit (HVAC unit) as one example and warms or cools the vehicle interior based on the refrigerant R having been cooled or heated in the refrigeration cycle 10, and a heat radiation unit 50 that radiates heat of the first heat medium HW to an atmosphere. In the vehicle air conditioner 1, the high-temperature cycle HS and the low-temperature cycle CS are formed as the refrigeration cycle 10, the temperature adjustment mechanism 30, and the heat radiation unit 50 are connected to one another through piping. The first heat medium HW flowing in the high-temperature cycle HS and the second heat medium CW flowing in the low-temperature cycle CS are supplied to a seat 60 provided in the vehicle interior IN.

[Refrigeration Cycle 10]

By having the circulating refrigerant R undergo compression, decompression, etc., the refrigeration cycle 10 absorbs heat from the second heat medium CW circulating in the low-temperature cycle CS and radiates the heat to the first heat medium HW circulating in the high-temperature cycle HS.

As shown in FIG. 1, the refrigeration cycle 10 includes a compressor 11, a condenser 13, a decompression unit 15, and an evaporator 17. The condenser 13 and the evaporator 17 are connected to each other by a refrigerant flow passage L1 and a refrigerant flow passage L2. The compressor 11 is provided in the refrigerant flow passage L1, and the decompression unit 15 is provided in the refrigerant flow passage L2. The refrigeration cycle 10 is provided in a vehicle exterior OUT of the vehicle.

As one example, an electrically operated compressor 11 is adopted as the compressor 11.

The compressor 11 suctions and compresses a low-temperature, low-pressure refrigerant R released from the evaporator 17, and discharges it toward the condenser 13 as a high-temperature, high-pressure refrigerant R in gas form.

The condenser 13 condenses the high-temperature, high-pressure refrigerant R in gas form into a high-temperature, high-pressure refrigerant R in liquid form. The condenser 13 is a heat exchanger for heating, and heats the second heat medium CW flowing through a high-temperature-side heat exchanger 23 constituting a part of the high-temperature cycle HS by the heat of the high-temperature, high-pressure refrigerant R. Thus, the condenser 13 is a water-refrigerant heat exchanger that realizes heat exchange between the refrigeration cycle 10 and the high-temperature cycle HS.

The decompression unit 15 decompresses and expands the high-temperature, high-pressure refrigerant R in liquid form coming out of the condenser 13 and discharges it toward the evaporator 17.

The evaporator 17 evaporates the refrigerant R having been decompressed by the decompression unit 15 into a low-temperature, low-pressure refrigerant R in gas form. The evaporator 17 is a heat exchanger for cooling, and cools the second heat medium CW flowing through a low-temperature-side heat exchanger 21 constituting a part of the low-temperature cycle CS by evaporating the refrigerant R. Thus, as with the condenser 13, the evaporator 17 is a water-refrigerant heat exchanger that realizes heat exchange between the refrigeration cycle 10 and the low-temperature cycle CS.

[Temperature Adjustment Mechanism 30 (Vehicle Interior IN)]

Next, the temperature adjustment mechanism 30 will be described.

As shown in FIG. 1, the temperature adjustment mechanism 30 includes a blower 31 that pressure-feeds, toward a downstream side, air (inside air or outside air) introduced by switching inside air from the vehicle interior or outside air through an inside-outside air switching damper (not shown). The temperature adjustment mechanism 30 also includes a cooler 33 that continues to the blower 31 and is provided in an air flow passage 39 inside a duct 38, a heater 35 that is provided farther on the downstream side than the cooler 33, and a temperature adjustment damper 37 that is provided between the cooler 33 and the heater 35.

The temperature adjustment mechanism 30 is installed, for example, inside an instrument panel at a front part of the vehicle interior IN, and blows out, to the vehicle interior IN, the air of which the temperature has been adjusted by the cooler 33 and the heater 35 according to one of blow-out modes of defrosting blow-out, face blow-out, and foot blow-out, to adjust the vehicle interior to a set temperature, an opening in each of the defrosting blow-out, the face blow-out, and the foot blow-out being directed toward the vehicle interior.

[Heat Radiation Unit 50 (Vehicle Exterior OUT)]

Next, the heat radiation unit 50 radiates the heat of the second heat medium CW flowing through the low-temperature-side heat exchanger 21 to the outside air. The heat radiation unit 50 includes a radiator 51 provided on an upstream side, and a fan 53 provided on the downstream side of the radiator 51.

In the fan 53, a motor is driven to rotate to generate an airflow, and this airflow passes through the radiator 51, thereby promoting heat exchange in the radiator 51. Thus, in the radiator 51, heat is exchanged between the outside air and the second heat medium CW flowing through the inside, and the heat is radiated to the outside air.

[High-Temperature Cycle HS]

The vehicle air conditioner 1 includes the high-temperature cycle HS having, as an element, the high-temperature-side heat exchanger 23 that exchanges heat with the condenser 13 through which the high-temperature, high-pressure refrigerant R flows. The high-temperature cycle HS adjusts the temperature of the vehicle interior using the first heat medium HW having been heated in the high-temperature-side heat exchanger 23, and also adjusts the temperature of the seat 60 in the vehicle interior.

The high-temperature cycle HS includes the heater 35 of the temperature adjustment mechanism 30 as an element, and further includes the following elements.

First, the high-temperature cycle HS includes, as flow passages for the first heat medium HW, a high-temperature flow passage HL1 that connects the high-temperature-side heat exchanger 23 and the heater 35 to each other, and a high-temperature flow passage HL2 that is connected to the heater 35 on the opposite side from the high-temperature flow passage HL1. In the high-temperature flow passage HL1, a high-temperature-side pump 34 and a three-way valve 36 are provided in this order from the side of the high-temperature-side heat exchanger 23. The high-temperature-side pump 34 delivers the first heat medium HW having passed through the high-temperature-side heat exchanger 23 toward the heater 35. The three-way valve 36 controls the direction of the first heat medium HW flowing through the high-temperature flow passage HL1.

The high-temperature cycle HS includes a high-temperature flow passage HL4 that is connected at one end to a connection point P4 and connected at the other end to a three-way valve 24 that is an element of the low-temperature cycle CS, and a high-temperature flow passage HL5 that is connected at one end to the three-way valve 36 and connected at the other end to a four-way valve 25 that is an element of the low-temperature cycle CS.

The three-way valve 24 includes three flow passages, a flow passage 24A, a flow passage 24B, and a flow passage 24C, each of which opening and closing is independently controlled. The same applies to the other three-way valves 32, 36.

The four-way valve 25 includes four flow passages, a flow passage 25A, a flow passage 25B, a flow passage 25C, and a flow passage 25D, each of which opening and closing is independently controlled. The same applies to the other four-way valve 41.

[Low-Temperature Cycle CS]

The vehicle air conditioner 1 includes the low-temperature cycle CS having, as an element, the low-temperature-side heat exchanger 21 that exchanges heat with the evaporator 17 through which the low-temperature, low-pressure refrigerant R flows. The low-temperature cycle CS adjusts the temperature of the vehicle interior using the second heat medium CW having been cooled by the low-temperature-side heat exchanger 21, and also adjusts the temperature of the seat in the vehicle interior.

The low-temperature cycle CS includes the radiator 51 of the heat radiation unit 50 as an element, and further includes the following elements.

First, the low-temperature cycle CS includes, as flow passages for the second heat medium CW, a low-temperature flow passage CL1 that connects the radiator 51 and the low-temperature-side heat exchanger 21 to each other, and a low-temperature flow passage CL2 that is connected at one end to the low-temperature-side heat exchanger 21 on the opposite side from the low-temperature flow passage CL1 and connected at the other end to the radiator 51. In the low-temperature flow passage CL1, the four-way valve 25 and a low-temperature-side pump 27 are provided in this order from the side of the radiator 51. The three-way valve 24 is provided in the low-temperature flow passage CL2. Further, the low-temperature cycle CS includes a low-temperature flow passage CL3 that is connected at one end to the low-temperature flow passage CL2 at a connection point P1 and connected at the other end to the cooler 33, and a low-temperature flow passage CL5 that is connected at one end to the cooler 33 and connected at the other end to the four-way valve 25.

The first heat medium HW and the second heat medium CW consisting of the same components circulate in the high-temperature cycle HS and the low-temperature cycle CS, respectively. This heat medium does not change in phase within service pressure and temperature ranges. For example, brine, i.e., water containing an antifreeze liquid can be used. In the high-temperature cycle HS (warm flow passage 61) and the low-temperature cycle CS (cold flow passage 63), the first heat medium HW and the second heat medium CW flow through flow passages that are separate and independent from each other.

The high-temperature cycle HS includes, in its configuration, the high-temperature-side pump 34 and the heater 35. The high-temperature-side pump 34 circulates the first heat medium HW inside the high-temperature cycle HS. A water delivery direction of the high-temperature-side pump 34 is controlled such that the refrigerant R flowing through the condenser 13 and the first heat medium HW flowing through the high-temperature-side heat exchanger 23 form opposing flows.

The high-temperature-side pump 34 makes the first heat medium HW having passed through the high-temperature-side heat exchanger 23 flow into the heater 35. While passing through the high-temperature-side heat exchanger 23, the first heat medium HW is heated by the high-temperature, high-pressure refrigerant R flowing through the condenser 13. Thus, the high-temperature first heat medium HW flows into the heater 35.

The low-temperature cycle CS includes, in its configuration, the radiator 51 and the low-temperature-side pump 27. The low-temperature-side pump 27 circulates the second heat medium CW inside the low-temperature cycle CS. A water delivery direction of the low-temperature-side pump 27 is controlled such that the refrigerant R flowing through the evaporator 17 and the second heat medium CW flowing through the low-temperature-side heat exchanger 21 form opposing flows.

The low-temperature-side pump 27 makes the second heat medium CW having passed through the low-temperature-side heat exchanger 21 flow into the radiator 51. While passing through the low-temperature-side heat exchanger 21, the second heat medium CW is cooled by the low-temperature, low-pressure refrigerant R flowing through the evaporator 17.

[Seat Temperature Adjustment Function]

In this embodiment, an example of adjusting the temperature of the seat 60 provided in the vehicle interior using the vehicle air conditioner 1 shown in FIG. 1 will be described with reference to FIG. 2 to FIG. 5.

First, a configuration different from FIG. 1 of the vehicle air conditioner 1 having a function of adjusting the temperature of the seat 60 will be described with reference to FIG. 2. A three-way valve 32 is provided instead of the flow adjustment valve 29, and a four-way valve 41 is provided instead of the three-way valve 36. The connection point P4 and the four-way valve 41 are connected to each other by a high-temperature flow passage HL6. The three-way valve 32 and the connection point P4 are connected to each other by the low-temperature flow passage CL4.

Figure 2:
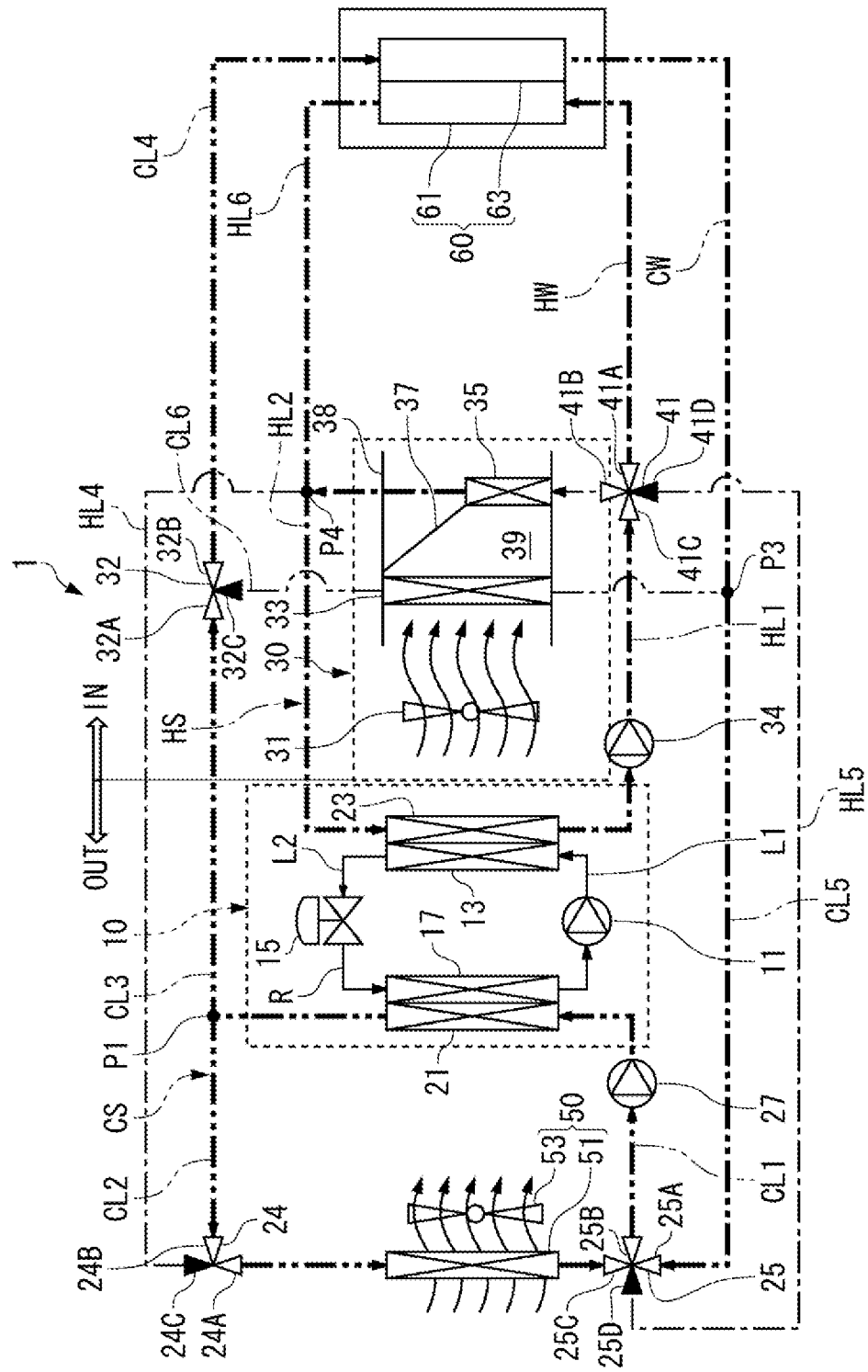
FIG. 2 is a circuit diagram when the vehicle air conditioner of FIG. 1, with a seat temperature adjustment function added thereto, is performing heating operation.

As shown in FIG. 2, the seat 60 is provided in the vehicle interior, and a warm flow passage 61 and a cold flow passage 63 are provided alongside each other inside the seat 60. To facilitate understanding, only one seat is extracted and described here. This circuit is the same in FIG. 3 and FIG. 4. The warm flow passage 61 is provided on the route of the high-temperature flow passage HL6, and the cold flow passage 63 is provided on the route of the low-temperature flow passage CL4. A direction in which the first heat medium HW flows in the warm flow passage 61 and a direction in which the second heat medium CW flows in the cold flow passage 63 are opposite from each other.

[Heating Operation]

Flows of the refrigerant R, the first heat medium HW, and the second heat medium CW when the vehicle air conditioner 1 performs heating operation will be described with reference to FIG. 2.

In heating operation of the vehicle air conditioner 1, the first heat medium HW having been heated by the high-temperature-side heat exchanger 23 is circulated through the high-temperature flow passage HL1 and the high-temperature flow passage HL2 to continuously supply the first heat medium HW to the heater 35 and heat the vehicle interior. Since the second heat medium CW is not flowing through the cooler 33, air pressure-fed by the blower 31 reaches the heater 35 without being cooled by the cooler 33.

In FIG. 2, flow passages in which the first heat medium HW and the second heat medium CW flow are depicted thick. The same applies to FIG. 3 and the subsequent drawings.

In addition to the above, in heating operation of the vehicle air conditioner 1, the temperature of the seat 60 is adjusted as follows.

The first heat medium HW having been heated by the high-temperature-side heat exchanger 23 is circulated through the high-temperature flow passage HL1, the high-temperature flow passage HL2, and the high-temperature flow passage HL6 to continuously supply the heated first heat medium HW to the warm flow passage 61. The second heat medium CW having been cooled by the low-temperature-side heat exchanger 21 is circulated through the low-temperature flow passage CL3, the low-temperature flow passage CL4, the low-temperature flow passage CL5, and parts of the low-temperature flow passage CL1 and the low-temperature flow passage CL2 to continuously supply the cooled second heat medium CW to the cold flow passage 63. The vehicle air conditioner 1 adjusts the temperature of the seat 60 by exchanging heat between the warm flow passage 61 and the cold flow passage 63.

During heating operation, the first heat medium HW having passed through the heater 35 flows to the high-temperature-side heat exchanger 23 through the high-temperature flow passage HL2.

During heating operation, the second heat medium CW having passed through the low-temperature-side heat exchanger 21 flows so as to branch into the low-temperature flow passage CL2 and the low-temperature flow passage CL3, and the second heat medium CW flowing through the low-temperature flow passage CL2 reaches the radiator 51 and the second heat medium CW flowing through the low-temperature flow passage CL3 reaches the cold flow passage 63. The second heat medium CW having passed through the cold flow passage 63 flows into the low-temperature flow passage CL1 through the four-way valve 25 and reaches the low-temperature-side heat exchanger 21.

Open and closed states of the flow passages of the three-way valve 24, the four-way valve 25, the three-way valve 32, and the four-way valve 41 during heating operation are as follows. In FIG. 2, closed flow passages of these valves are blacked out. The same applies to FIG. 3, FIG. 4, etc.

Three-way valve 24 flow passage 24A: open, flow passage 24B: open, flow passage 24C: closed Four-way valve 25 flow passage 25A: open, flow passage 25B: open, flow passage 25C: open, flow passage 25D: closed Three-way valve 32 flow passage 32A: open, flow passage 32B: open, flow passage 32C: closed Four-way valve 41 flow passage 41A: open, flow passage 41B: open, flow passage 41C: open, flow passage 41D: closed

[Dehumidifying and Heating]

Next, flows of the refrigerant R, the first heat medium HW, and the second heat medium CW when the vehicle air conditioner 1 performs dehumidifying and heating operation will be described with reference to FIG. 3. As dehumidifying and heating operation has some parts in common with heating operation having been described with reference to FIG. 2, in the following, dehumidifying and heating operation will be described in terms of differences from heating operation.

Figure 3:
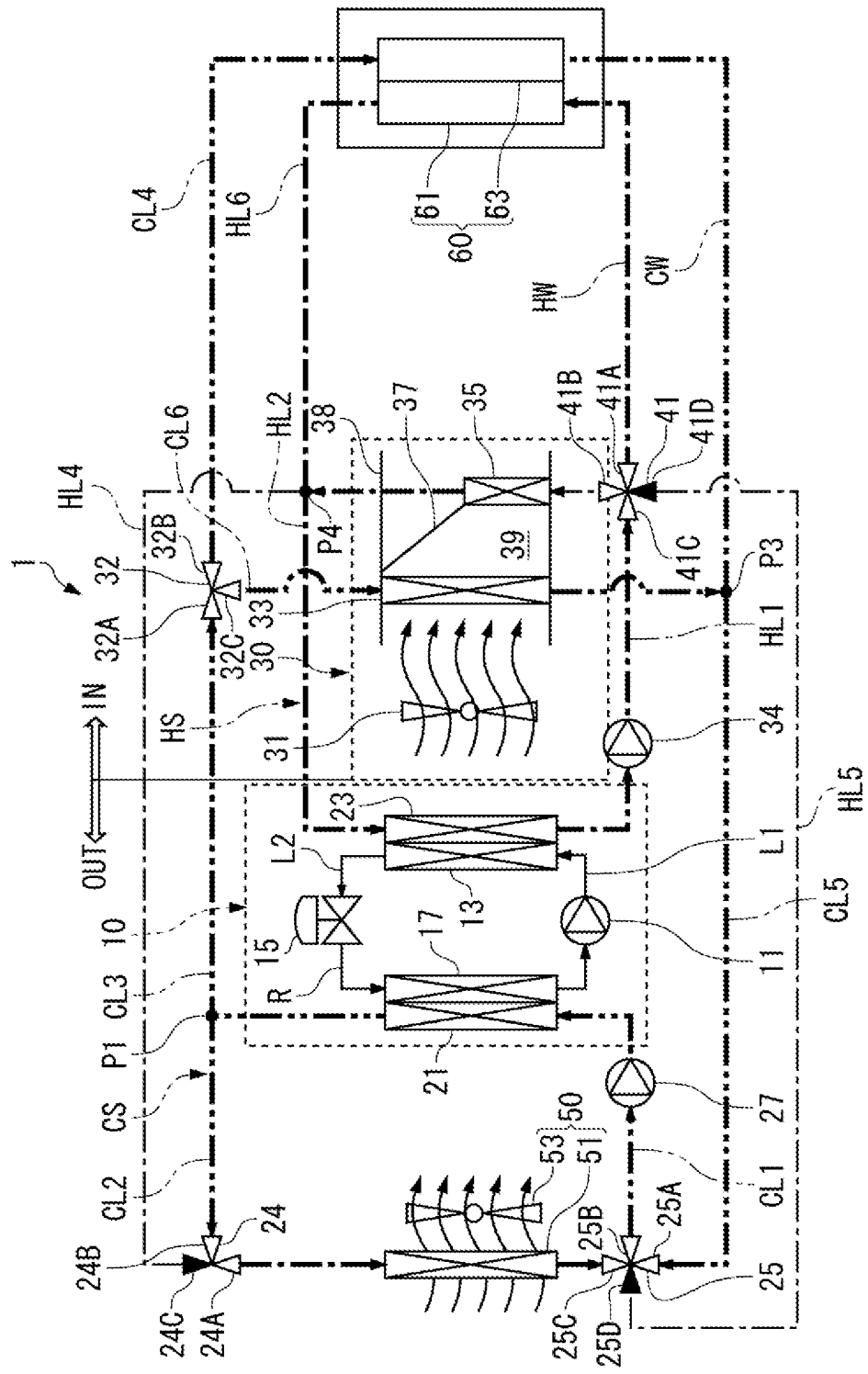
FIG. 3 is a circuit diagram when the vehicle air conditioner of FIG. 1, with the seat temperature adjustment function added thereto, is performing dehumidifying and heating operation.

As shown in FIG. 3, in dehumidifying and heating operation, the flow passages in three directions of the three-way valve 32 are open. The second heat medium CW flows toward the cooler 33, and the second heat medium CW having passed through the cooler 33 reaches the four-way valve 25 through the low-temperature flow passage CL5 and flows into the low-temperature-side heat exchanger 21. Thus, heating operation and dehumidifying and heating operation can be switched by controlling opening and closing of the flow passages of the three-way valve 32.

As for temperature adjustment of the seat 60, a difference lies in that, in heating operation, the whole second heat medium CW is supplied to the cold flow passage 63, whereas in dehumidifying and heating, part of the second heat medium CW is used for dehumidification.

Open and closed states of the flow passages of the three-way valve 24, the four-way valve 25, the three-way valve 32, and the four-way valve 41 during dehumidifying and heating operation are as follows. The difference from heating operation shown in FIG. 2 is opening and closing of the flow passage 32C of the three-way valve 32.

Three-way valve 24 flow passage 24A: open, flow passage 24B: open, flow passage 24C: closed Four-way valve 25 flow passage 25A: open, flow passage 25B: open, flow passage 25C: open, flow passage 25D: closed Three-way valve 32 flow passage 32A: open, flow passage 32B: open, flow passage 32C: open Four-way valve 41 flow passage 41A: open, flow passage 41B: open, flow passage 41C: open, flow passage 41D: closed

[Cooling Operation]

Figure 4:
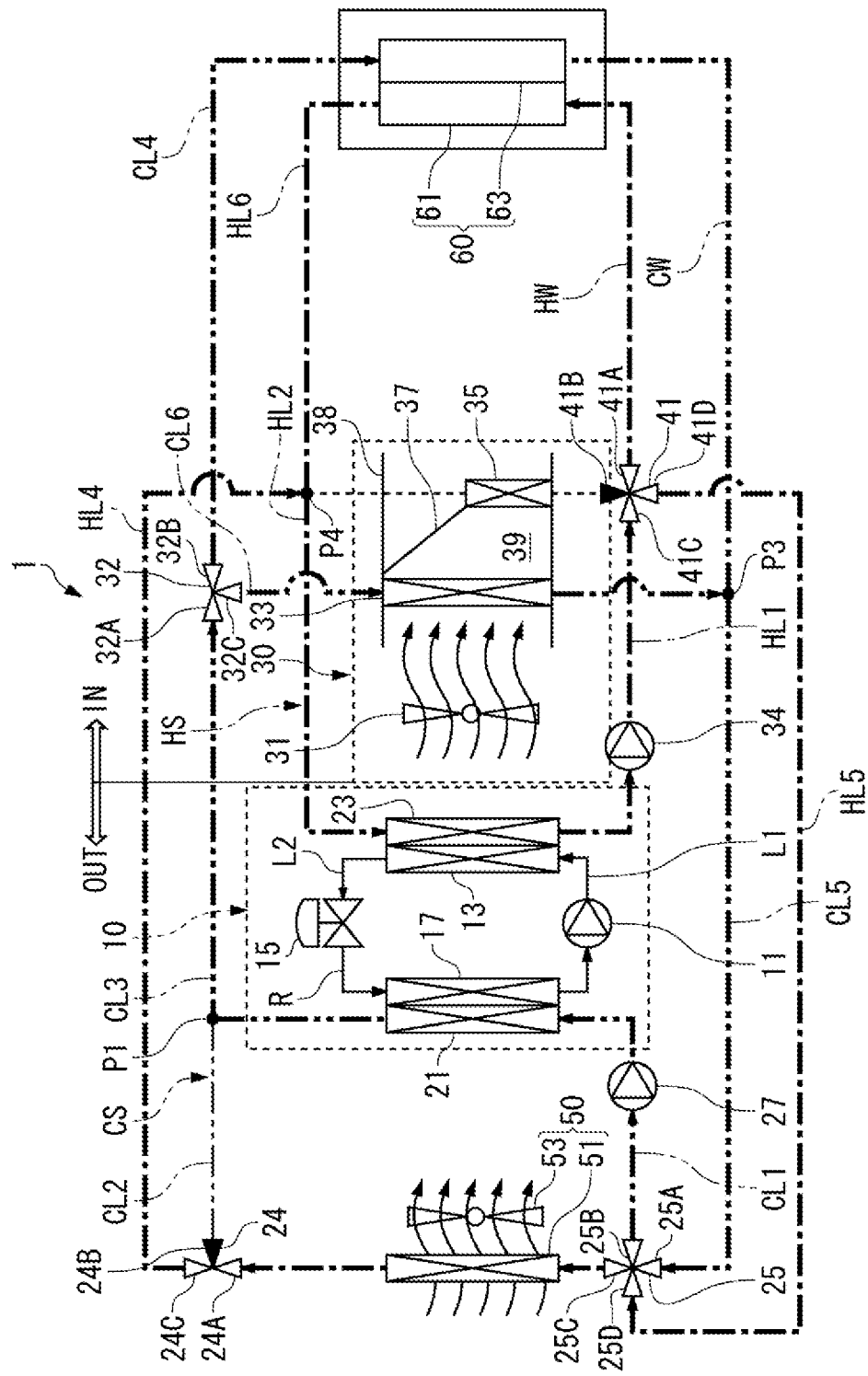
FIG. 4 is a circuit diagram when the vehicle air conditioner of FIG. 1, with the seat temperature adjustment function added thereto, is performing cooling operation.

Next, flows of the refrigerant R, the first heat medium HW, and the second heat medium CW when the vehicle air conditioner 1 performs cooling operation will be described with reference to FIG. 4. As cooling operation has some parts in common with dehumidifying and heating operation having been described with reference to FIG. 3, in the following, cooling operation will be described in terms of differences from dehumidifying and heating operation.

In cooling operation, part of the first heat medium HW having been heated by the high-temperature-side heat exchanger 23 flows into the high-temperature flow passage HL5 through the four-way valve 41, and is further supplied to the radiator 51 through the four-way valve 25. The first heat medium HW having passed through the radiator 51 passes through the three-way valve 24 and flows through the high-temperature flow passage HL4 to reach the high-temperature-side heat exchanger 23.

As has been described above, in cooling operation, a circulation passage including the low-temperature-side heat exchanger 21 and the cooler 33 is formed for the cooled second heat medium CW. As this circulation passage is formed, cooling operation is realized. For the heated first heat medium HW, a circulation passage including the high-temperature-side heat exchanger 23 of the refrigeration cycle 10 and the warm flow passage 61 of the seat 60, and a circulation passage including the high-temperature-side heat exchanger 23 of the refrigeration cycle 10 and the radiator 51 of the heat radiation unit 50 are formed.

Open and closed states of the flow passages of the three-way valve 24, the four-way valve 25, the three-way valve 32, and the four-way valve 41 during cooling operation are as follows:

Three-way valve 24 flow passage 24A: open, flow passage 24B: closed, flow passage 24C: open Four-way valve 25 flow passage 25A: open, flow passage 25B: open, flow passage 25C: open, flow passage 25D: open Three-way valve 32 flow passage 32A: open, flow passage 32B: open, flow passage 32C: open Four-way valve 41 flow passage 41A: open, flow passage 41B: closed, flow passage 41C: open, flow passage 41D: open

[Flow Passages in Seat 60]

Next, an example of arrangement of the warm flow passage 61 and the cold flow passage 63 in the seat 60 will be described with reference to FIG. 5. The warm flow passage 61 and the cold flow passage 63 in this example are formed by flexible pipe members and are provided close to each other. Being close in this disclosure means that the warm flow passage 61 and the cold flow passage 63 may be in contact with each other or the warm flow passage 61 and the cold flow passage 63 may be spaced a little apart from each other.

The seat 60 includes a seating face 60*a*, a back support 60*b* rising from the seating face 60*a*, and a headrest 60*c* mounted at an upper part of the back support 60*b*.

Figure 5:
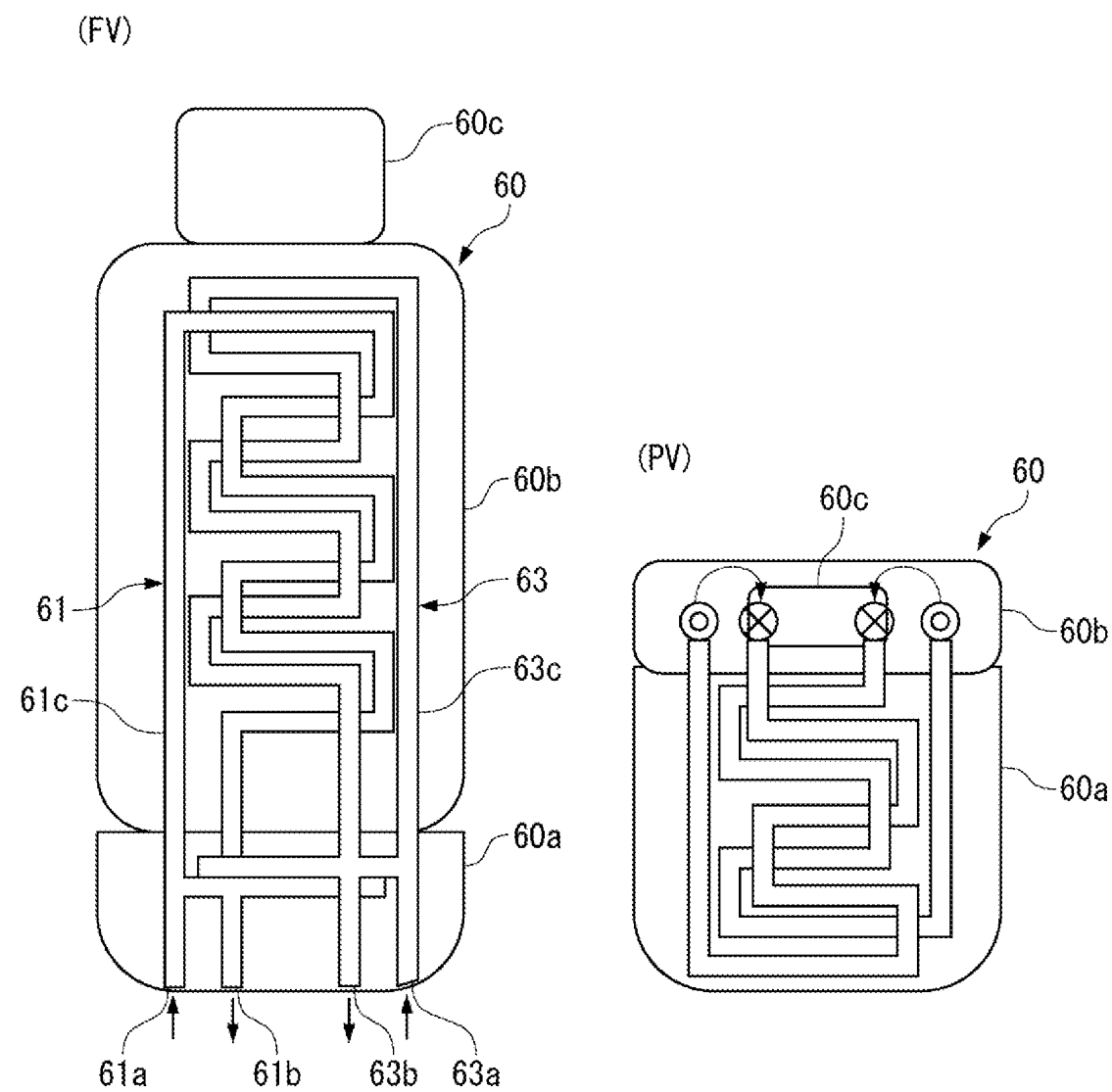
FIG. 5 is a view showing passages of cold water and warm water in a seat having the temperature adjustment function of FIG. 2 to FIG. 4.

As shown in FIG. 5, the warm flow passage 61 has an introduction port 61*a* for the heated first heat medium HW and a discharge port 61*b* for the heated first heat medium HW, both provided in the seating face 60*a*. For the introduction port 61*a*, a pipe 61*c* is provided between the introduction port 61*a* and the discharge port 61*b*, and the first heat medium HW supplied from the introduction port 61*a* passes through the pipe 61*c* and is discharged from the discharge port 61*b*. The pipe 61*c* is provided so as to meander in the seating face 60*a* and the back support 60*b* in this order, and turns back at an upper part of the back support 60*b* toward a lower side as indicated by the arrow. Then, it meanders in the back support 60*b* and the seating face 60*a* in this order and leads to the discharge port 61*b* in the seating face 60*a*.

As shown in FIG. 5, the cold flow passage 63 has an introduction port 63*a* for the cooled second heat medium CW and a discharge port 63*b* for the cooled second heat medium CW, both provided in the seating face 60*a*. For the introduction port 63*a*, a pipe 63*c* is provided between the introduction port 63*a* and the discharge port 63*b*, and the second heat medium CW supplied from the introduction port 63*a* passes through the pipe 63*c* and is discharged from the discharge port 63*b*. The pipe 63*c* is provided so as to meander in the seating face 60*a* and the back support 60*b* in this order, and turns back at an upper part of the back support 60*b* toward the lower side as indicated by the arrow. Then, it meanders in the back support 60*b* and the seating face 60*a* in this order and leads to the discharge port 63*b* in the seating face 60*a*.

The pipe 61*c* of the warm flow passage 61 and the pipe 63*c* of the cold flow passage 63 are provided adjacent to each other while meandering in the seating face 60*a* and the back support 60*b*. Thus, the warm flow passage 61 and the cold flow passage 63 can cool and heat the seat 60 while exchanging heat with each other by adjusting the amounts of the first heat medium HW and the second heat medium CW flowing through the warm flow passage 61 and the cold flow passage 63, respectively.

Effects of First Embodiment

Next, the effects of the vehicle air conditioner 1 will be described.

[Effect 1]

According to the vehicle air conditioner 1 of this disclosure, the warm flow passage 61 and the cold flow passage 63 are disposed close to each other in the seat 60. The seat 60 can be cooled and heated by adjusting the amounts of the first heat medium HW and the second heat medium CW flowing through the warm flow passage 61 and the cold flow passage 63, respectively.

[Effect 2]

According to the vehicle air conditioner 1 of this disclosure, the first heat medium HW and the second heat medium CW supplied to the warm flow passage 61 and the cold flow passage 63, respectively, of the seat 60 are in liquid form. Since liquids are used as the heat media, the heat accumulation property is high compared with that of air, and comfort can be maintained also when getting into or out of the vehicle or when the device is stopped.

[Effect 3]

Further, according to the vehicle air conditioner 1 of this disclosure, the warm flow passage 61 and the cold flow passage 63 are separate and independent from each other.

Thus, according to the first embodiment, the first heat medium HW and the second heat medium CW are not mixed, which can eliminate the need for a capacity required for mixing.

In addition, the roles of the first heat medium HW and the second heat medium CW can be maintained, so that heat management for other on-board devices can be performed.

Second Embodiment

[Temperature Adjustment of a Plurality of Seats]

Next, a second embodiment will be described with reference to FIG. 6 to FIG. 9. The second embodiment proposes a vehicle air conditioner 2 that can separately adjust the temperature of each of a plurality of, specifically, four seats 60 (60A, 60B, 60C, 60D).

[Circuit Configuration]

Figure 6:
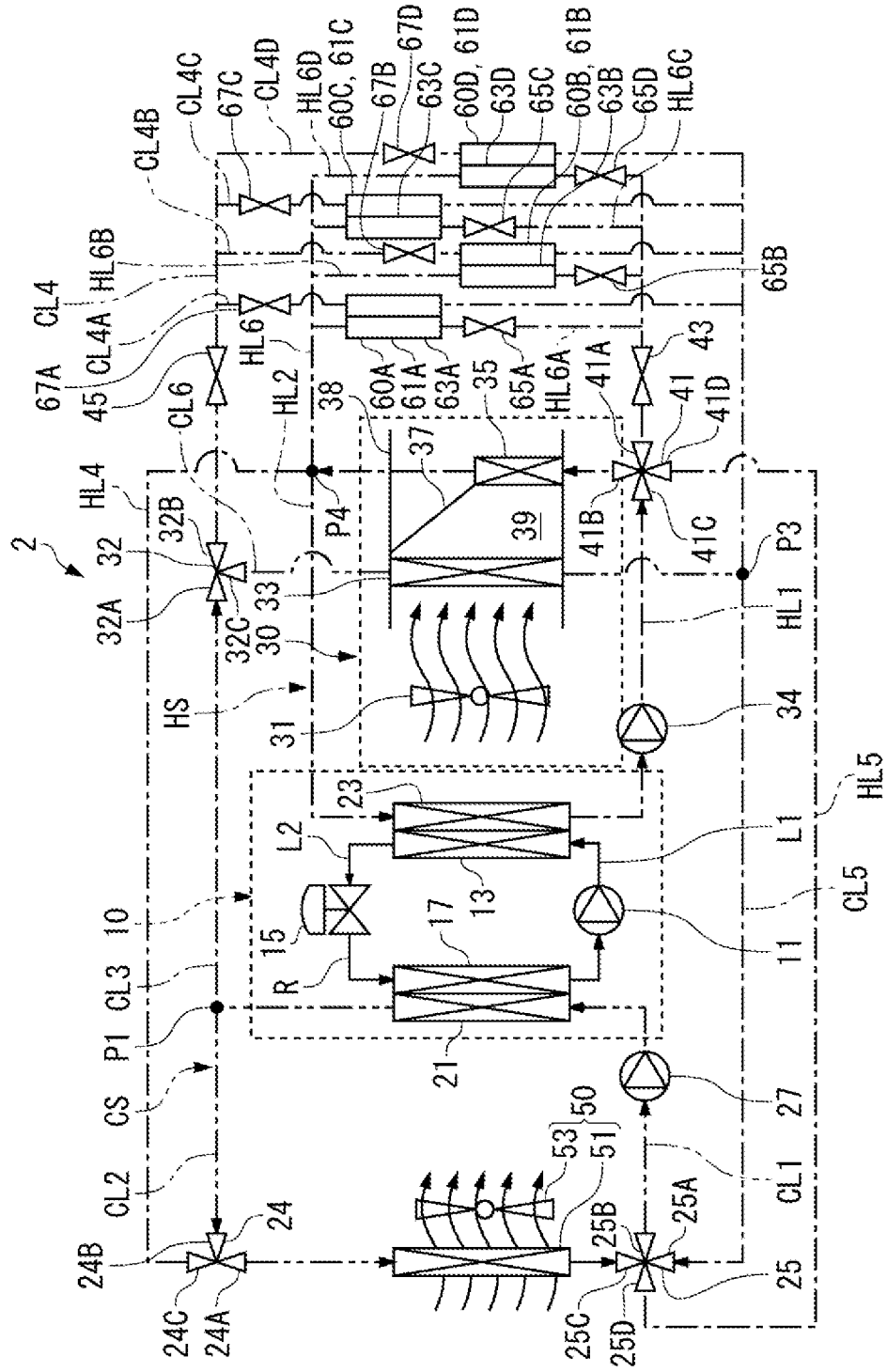
FIG. 6 is a circuit diagram of the vehicle air conditioner of FIG. 1 that includes a function of adjusting the temperatures of a plurality of seats.

First, the circuit configuration of the vehicle air conditioner 2 will be described with reference to FIG. 6. As the vehicle air conditioner 2 shares the same circuit configuration with the vehicle air conditioner 1, in the following, the vehicle air conditioner 2 will be described mainly in terms of differences from the vehicle air conditioner 1. In FIG. 6 to FIG. 9, the same parts and members as in the vehicle air conditioner 1 are denoted by the same reference signs as those in FIG. 1.

[High-Temperature Cycle HS]

The vehicle air conditioner 2 has the high-temperature cycle HS in which the high-temperature flow passage HL6 branches into four first branch flow passages HL6A, HL6B, HL6C, and HL6D. The high-temperature flow passage HL6 includes a first total amount valve 43 that adjusts the magnitude of the amount of first heat medium HW flowing into the first branch flow passages HL6A, HL6B, HL6C, and HL6D, and this first total amount valve 43 is provided between the four-way valve 41 and a portion where the high-temperature flow passage HL6 branches. With reference to the flow direction of the first heat medium HW, the first total amount valve 43 is provided farther upstream than the portion where the high-temperature flow passage HL6 branches. Upstream and downstream in the high-temperature flow passage HL6 are based on this reference.

In the first branch flow passages HL6A, HL6B, HL6C, and HL6D, first separate valves 65A, 65B, 65C, 65D are provided on the upstream side of the seats 60A, 60B, 60C, 60D, respectively. The first separate valves 65A, 65B, 65C, 65D adjust the magnitudes of the amounts of first heat medium HW flowing into the warm flow passages 61A, 61B, 61C, 61D, respectively, that are provided in the seats 60A, 60B, 60C, 60D. Thus, the vehicle air conditioner 2 can separately adjust the amounts of first heat medium HW flowing through the warm flow passages 61A, 61B, 61C, 61D.

[Low-Temperature Cycle CS]

The vehicle air conditioner 2 has the low-temperature cycle CS in which the low-temperature flow passage CL4 branches into four second branch flow passages CL4A, CL4B, CL4C, and CL4D. The low-temperature flow passage CL4 includes a second total amount valve 45 that adjusts the magnitude of the amount of second heat medium CW flowing into the second branch flow passages CL4A, CL4B, CL4C, and CL4D. The second total amount valve 45 is provided between the four-way valve 41 and a portion where the low-temperature flow passage CL4 branches. With reference to the flow direction of the second heat medium CW, the second total amount valve 45 is provided farther upstream than the portion where the low-temperature flow passage CL4 branches. Upstream and downstream in the low-temperature flow passage CL4 are based on this reference.

In the second branch flow passages CL4A, CL4B, CL4C, and CL4D, second separate valves 67A, 67B, 67C, 67D are provided on the upstream side of the seats 60A, 60B, 60C, 60D, respectively. The second separate valves 67A, 67B, 67C, 67D adjust the magnitudes of the amounts of second heat medium CW flowing into the cold flow passages 63A, 63B, 63C, 63D, respectively, that are provided in the seats 60A, 60B, 60C, 60D. Thus, the vehicle air conditioner 2 can separately adjust the amounts of second heat medium CW flowing through the cold flow passages 63A, 63B, 63C, 63D.

[Heating, Dehumidifying and Heating, and Cooling Operations]

Figure 7:
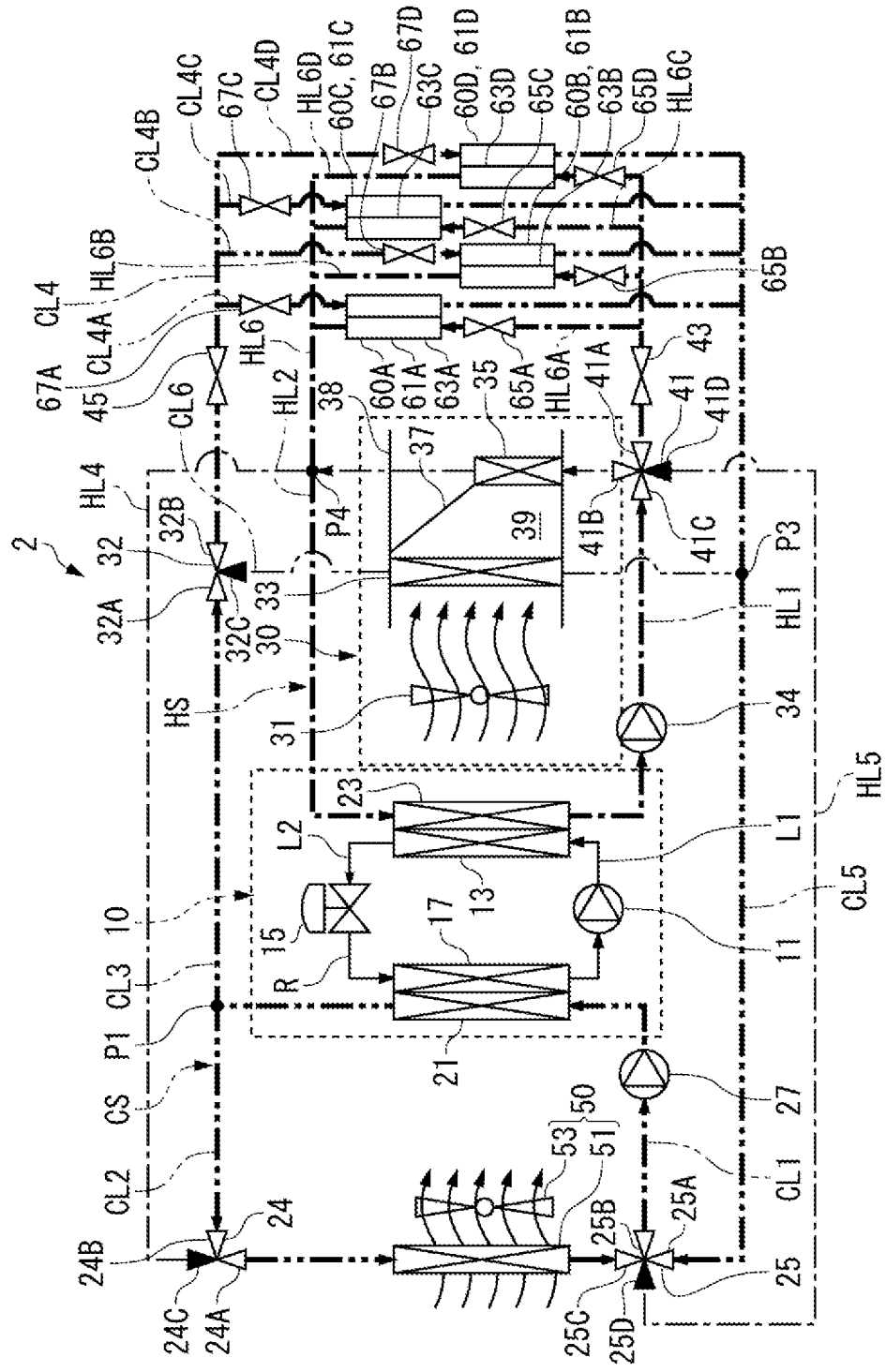
FIG. 7 is a circuit diagram when the vehicle air conditioner of FIG. 6 is performing heating operation.
Figure 8:
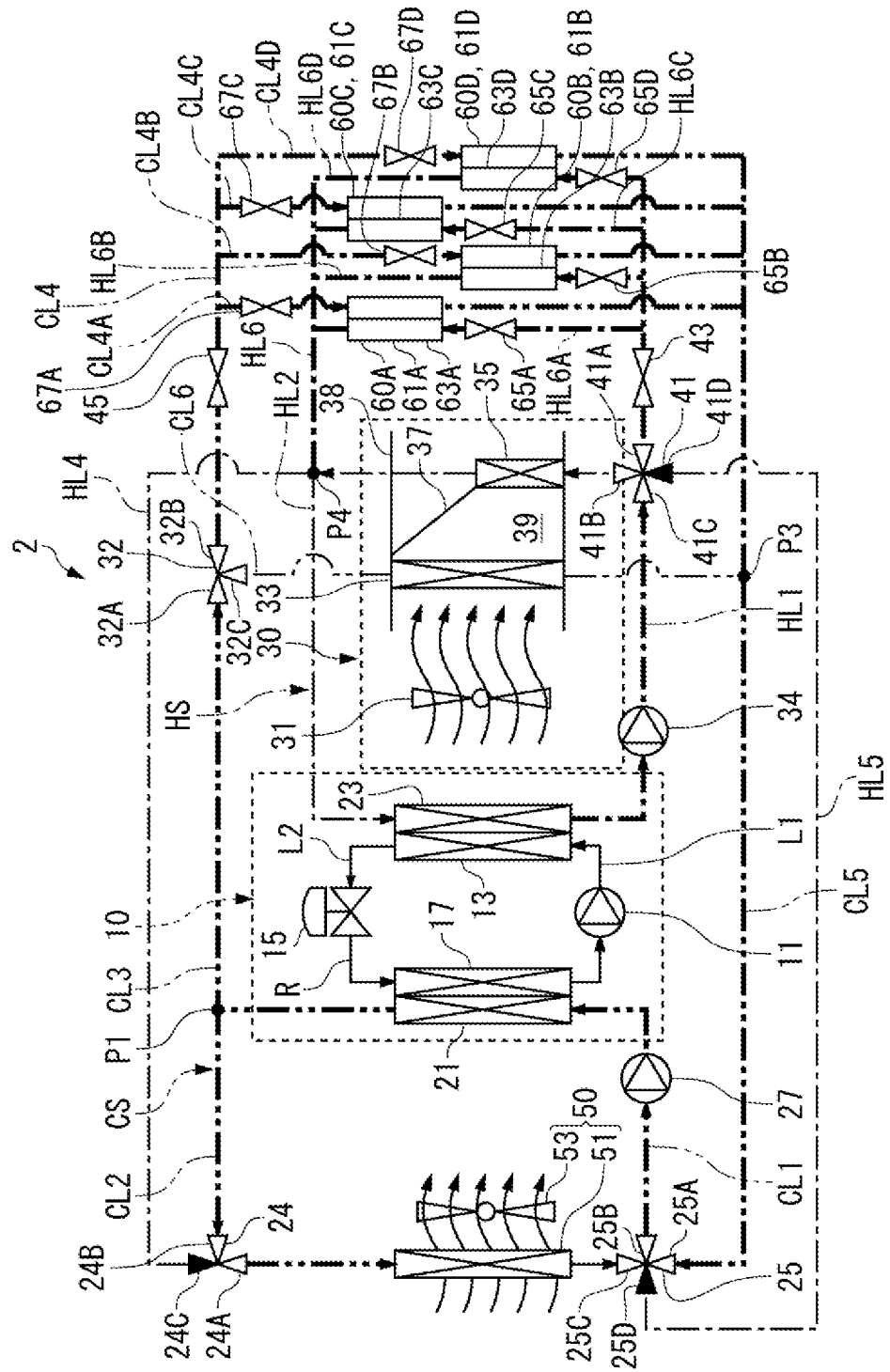
FIG. 8 is a circuit diagram when the vehicle air conditioner of FIG. 6 is performing dehumidifying and heating operation.
Figure 9:
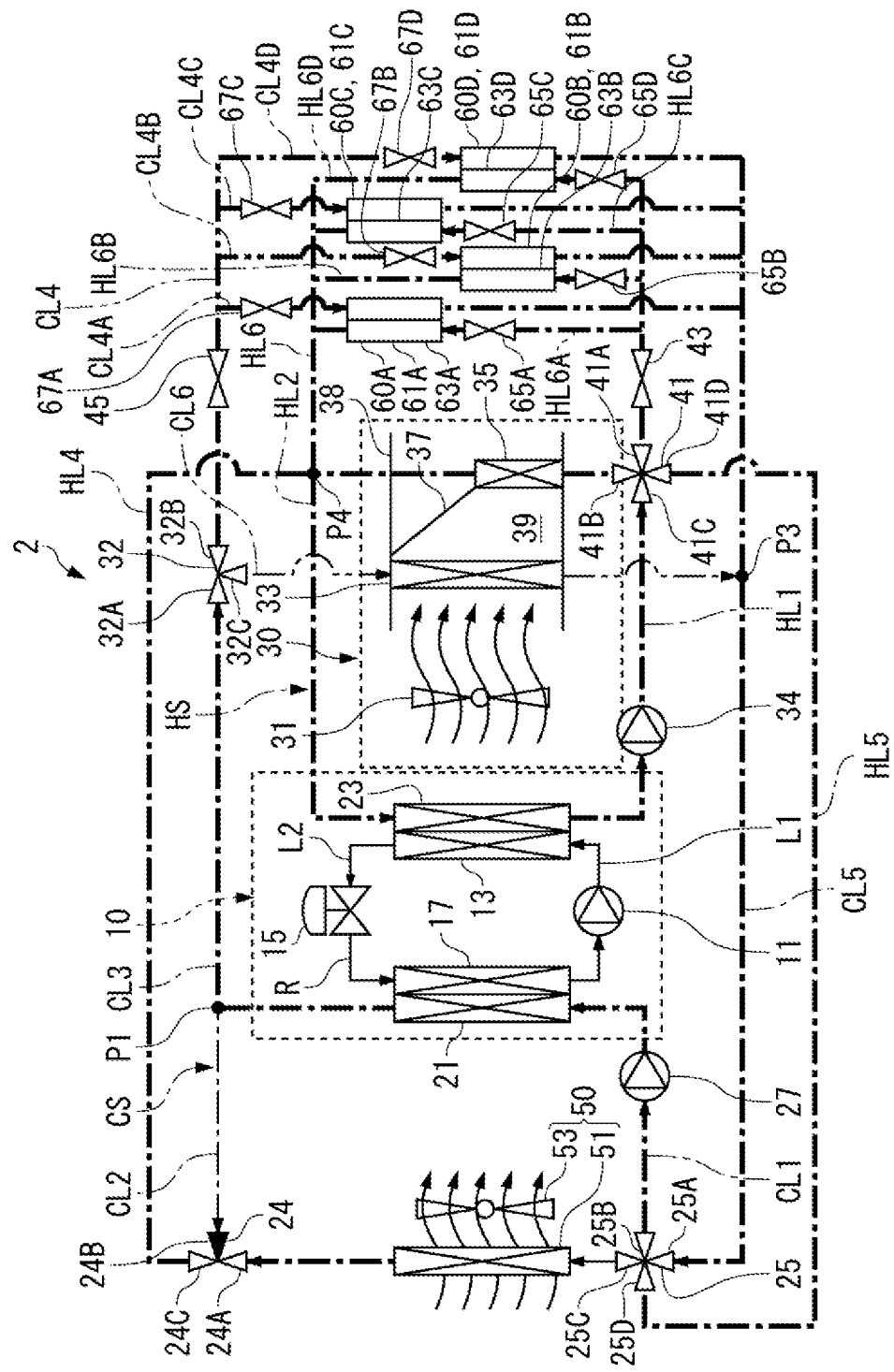
FIG. 9 is a circuit diagram when the vehicle air conditioner of FIG. 6 is performing cooling operation.

Next, heating operation, dehumidifying and heating, and cooling operation in the vehicle air conditioner 2 will be described with reference to FIG. 7 to FIG. 9. Also these operations will be described mainly in terms of differences from the vehicle air conditioner 1.

As with the vehicle air conditioner 1, the vehicle air conditioner 2 can perform heating operation (FIG. 7), dehumidifying and heating operation (FIG. 8), and cooling operation (FIG. 9) by activating the refrigeration cycle 10. The temperatures of the seats 60A, 60B, 60C, 60D are adjusted as the first heat medium HW and the second heat medium CW flow in the high-temperature cycle HS and the low-temperature cycle CS in each operation as will be described below.

[High-Temperature Cycle HS]

In heating operation, the flow passage 41A and the flow passage 41C of the four-way valve 41 are open, so that the first heat medium HW passes through the first total amount valve 43 and flows to the warm flow passages 61A, 61B, 61C, 61D. Here, the amount of first heat medium HW flowing to the warm flow passages 61A, 61B, 61C, 61D as a whole is adjusted by the first total amount valve 43. The amount of the first heat medium HW flowing to each of the warm flow passages 61A, 61B, 61C, 61D is also adjusted.

[Low-Temperature Cycle CS]

In heating operation, the flow passage 32A and the flow passage 32B of the three-way valve 32 are open, so that the second heat medium CW flows to the cold flow passages 63A, 63B, 63C, 63D through the second total amount valve 45. Here, the amount of second heat medium CW flowing to the cold flow passages 63A, 63B, 63C, 63D as a whole is adjusted by the second total amount valve 45. The amount of first heat medium HW flowing to each of the cold flow passages 63A, 63B, 63C, 63D is also adjusted.

As has been described above, the vehicle air conditioner 2 can adjust the temperatures of the seats 60A, 60B, 60C, 60D by adjusting the amounts of second heat medium CW flowing to the warm flow passages 61A, 61B, 61C, 61D and the cold flow passages 63A, 63B, 63C, 63D while performing heating operation, dehumidifying and heating, or cooling operation by the temperature adjustment mechanism 30. In particular, the vehicle air conditioner 2 can adjust the amount of second heat medium CW flowing through each of the warm flow passages 61A, 61B, 61C, 61D and the cold flow passages 63A, 63B, 63C, 63D.

Effects of Second Embodiment

The vehicle air conditioner 2 according to the second embodiment achieves the following Effect 5 and Effect 6 in addition to Effect 1 to Effect 4 of the vehicle air conditioner 1.

[Effect 5]

According to the vehicle air conditioner 2, the amount of second heat medium CW flowing through each of the warm flow passages 61A, 61B, 61C, 61D and the cold flow passages 63A, 63B, 63C, 63D can be adjusted. Thus, the temperature of each of the plurality of seats 60A, 60B, 60C, 60D can be adjusted according to the preference of an occupant.

[Additional Statement]

The vehicle air conditioner 1 described in the above embodiments can be understood as follows.

[Configuration of Vehicle Air Conditioner 1 According to First Aspect]

The vehicle air conditioner 1 according to a first aspect includes: the refrigeration cycle 10 in which a refrigerant circulates; the high-temperature cycle HS in which the first heat medium HW heated by the refrigeration cycle 10 circulates; the low-temperature cycle CS in which the second heat medium CW cooled by the refrigeration cycle 10 circulates; and the seat 60 that is provided in the vehicle interior and has the warm flow passage 61 and the cold flow passage 63 disposed close to each other.

In the vehicle air conditioner 1, the warm flow passage 61 is provided on the route of the high-temperature cycle HS, and the cold flow passage 63 is provided on the route of the low-temperature cycle CS.

[Effects of Vehicle Air Conditioner 1 According to First Aspect]

In the vehicle air conditioner 1 according to the first aspect, the warm flow passage 61 and the cold flow passage 63 are disposed close to each other in the seat 60. The seat 60 can be cooled and heated by adjusting the amounts of the first heat medium HW and the second heat medium CW flowing through the warm flow passage 61 and the cold flow passage 63, respectively.

According to the vehicle air conditioner 1, the first heat medium HW and the second heat medium CW supplied to the warm flow passage 61 and the cold flow passage 63, respectively, of the seat 60 are in liquid form. Since liquids are used as the heat media, the heat accumulation property is high compared with that of air, and comfort can be maintained also when getting into or out of the vehicle or when the device is stopped.

Further, according to the vehicle air conditioner 1, the warm flow passage 61 and the cold flow passage 63 are separate and independent from each other. Thus, according to the first embodiment, the first heat medium HW and the second heat medium CW are not mixed, which can eliminate the need for a capacity required for mixing. In addition, the roles of the first heat medium HW and the second heat medium CW can be maintained, so that heat management for other on-board devices can be performed.

[Configuration of Vehicle Air Conditioner 1 According to Second Aspect]

The vehicle air conditioner 1 according to a second aspect includes the temperature adjustment mechanism 30 that is provided in the vehicle interior IN and configured to adjust the temperature of air supplied to the vehicle interior. The temperature adjustment mechanism 30 includes the heater 35 configured to heat the air to be supplied and the cooler 33 configured to cool the air to be supplied. The heater 35 is provided on the route of the high-temperature cycle HS, parallel to the warm flow passage 61, and the cooler 33 is provided on the route of the low-temperature cycle CS, parallel to the cold flow passage 63.

[Effects of Vehicle Air Conditioner 1 According to Second Aspect]

The vehicle air conditioner 1 according to the second aspect can cool and heat the seat 60 while performing temperature adjustment, such as heating or cooling, of the vehicle interior IN.

[Configuration of Vehicle Air Conditioner 1 According to Third Aspect]

The refrigeration cycle 10 in the vehicle air conditioner 1 according to a third aspect includes: the compressor 11 configured to compress the refrigerant; the condenser 13 configured to condense the refrigerant having been compressed by the compressor 11; the decompression unit 15 configured to decompress the refrigerant having been condensed by the condenser 13; and the evaporator 17 configured to evaporate the refrigerant having been decompressed by the decompression unit 15.

The high-temperature cycle HS includes the high-temperature-side heat exchanger 23 configured to make the refrigerant flowing through the condenser 13 and the first heat medium exchange heat with each other, and the low-temperature cycle CS includes the low-temperature-side heat exchanger 21 configured to make the refrigerant flowing through the evaporator 17 and the second heat medium exchange heat with each other.

[Effects of Vehicle Air Conditioner 1 According to Third Aspect]

The vehicle air conditioner 1 according to the third aspect can cool and heat the seat 60 while performing temperature adjustment, such as heating or cooling, of the vehicle interior IN.

[Configuration of Vehicle Air Conditioner 1 According to Fourth Aspect]

In the vehicle air conditioner 1 according to a fourth aspect, the direction in which the first heat medium HW flows in the warm flow passage 61 and the direction in which the second heat medium CW flows in the cold flow passage 63 are opposite from each other.

[Effects of Vehicle Air Conditioner 1 According to Fourth Aspect]

The vehicle air conditioner 1 according to the fourth aspect can eliminate the need for a fan that generates a convection flow.

[Configuration of Vehicle Air Conditioner 1 According to Fifth Aspect]

The vehicle air conditioner 1 according to a fifth aspect includes: a plurality of seats 60 provided in the vehicle interior; the warm flow passage 61 and the cold flow passage 63 provided in each of the seats 60; the first total amount valve 43 configured to adjust the amount of first heat medium HW supplied from the high-temperature cycle HS to the plurality of seats 60; and the second total amount valve 45 configured to adjust the amount of second heat medium CW supplied from the low-temperature cycle CS to the plurality of seats 60.

[Effects of Vehicle Air Conditioner 1 According to Fifth Aspect]

The vehicle air conditioner 1 according to the fifth aspect allows each individual to set the temperature according to his or her preference, without depending on the temperature of air blown out of the temperature adjustment mechanism 30, by adjusting the balance between the flow rates of the first heat medium HW and the second heat medium CW in the plurality of seats 60.

[Configuration of Vehicle Air Conditioner 1 According to Sixth Aspect]

The vehicle air conditioner 1 according to a sixth aspect includes the first branch flow passages HL6A, HL6B, HL6C, HL6D in which the plurality of warm flow passages 61 is respectively provided, and the second branch flow passages CL4A, CL4B, CL4C, CL4D in which the plurality of cold flow passages 63 is respectively provided. In addition, the vehicle air conditioner 1 includes the first separate valves 65A, 65B, 65C, 65D that are provided in the first branch flow passages HL6A, HL6B, HL6C, HL6D, respectively, and adjust the flow rates of the first heat medium HW supplied to the plurality of first branch flow passages HL6A, HL6B, HL6C, HL6D, and the second separate valves 67A, 67B, 67C, 67D that are provided in the second branch flow passages CL4A, CL4B, CL4C, CL4D, respectively, and adjust the flow rates of the second heat medium CW supplied to the plurality of second branch flow passages CL4A, CL4B, CL4C, CL4D.

[Effects of Vehicle Air Conditioner 1 According to Sixth Aspect]

The vehicle air conditioner 1 according to the sixth aspect adjusts the total flow rate of the heat media required for individual temperature adjustment through opening degrees of the first total amount valve 43 and the second total amount valve 45. Thus, the effect of a change in the flow rate balance resulted from a change of the temperature of the seat made by one occupant on temperature adjustment of the other seats can be minimized. Since energy is consumed only in seats where occupants are present, an energy saving effect can be expected.

Other than the above, configurations presented in the embodiments may be selectively adopted or changed to other configurations as necessary.

REFERENCE SINGS LIST 1, 2 Vehicle air conditioner
L1 Refrigerant flow passage
L2 Refrigerant flow passage
HS High-temperature cycle
HL1, HL2, HL4, HL5, HL6 High-temperature flow passage
HL6A, HL6B, HL6C, HL6D First branch flow passage
CS Low-temperature cycle
CL1, CL2, CL3, CL4, CL5 Low-temperature flow passage
CL4A, CL4B, CL4C, CL0D Second branch flow passage
R Refrigerant
HW First heat medium
CW Second heat medium
10 Refrigeration cycle
21 Low-temperature-side heat exchanger
23 High-temperature-side heat exchanger
24, 32, 36 Three-way valve 25, 41 Four-way valve
27 Low-temperature-side pump
30 Temperature adjustment mechanism
31 Blower
43 First total amount valve
45 Second total amount valve
60, 60A, 60B, 60C, 60D Seat
61, 61A, 61B, 61C, 61D Warm flow passage
63, 63A, 63B, 63C, 63D Cold flow passage
65A, 65B, 65C, 65D First separate valve
67A, 67B, 67C, 67D Second separate valve

The invention claimed is:

1. A vehicle air conditioner comprising:
a refrigeration cycle in which a refrigerant circulates;
a high-temperature cycle in which a first heat medium in liquid form heated by the refrigeration cycle circulates;
a low-temperature cycle in which a second heat medium in liquid form cooled by the refrigeration cycle circulates; and
a seat that is provided in a vehicle interior and has a warm flow passage and a cold flow passage disposed adjacent to each other, wherein
the warm flow passage is provided on a route of the high-temperature cycle, and
the cold flow passage is provided on a route of the low-temperature cycle.

2. The vehicle air conditioner according to claim 1, further comprising a temperature adjustment mechanism that is provided in the vehicle interior and configured to adjust a temperature of air supplied to the vehicle interior, wherein
the temperature adjustment mechanism includes a heater configured to heat the air to be supplied and a cooler configured to cool the air to be supplied,
the heater is provided on a route of the high-temperature cycle, parallel to the warm flow passage, and
the cooler is provided on a route of the low-temperature cycle, parallel to the cold flow passage.

3. The vehicle air conditioner according to claim 1, wherein
the refrigeration cycle includes:
a compressor configured to compress the refrigerant;
a condenser configured to condense the refrigerant having been compressed by the compressor; and
an evaporator configured to evaporate the refrigerant from the condenser,
the high-temperature cycle includes a high-temperature-side heat exchanger configured to make the refrigerant flowing through the condenser and the first heat medium exchange heat with each other, and
the low-temperature cycle includes a low-temperature-side heat exchanger configured to make the refrigerant flowing through the evaporator and the second heat medium exchange heat with each other.

4. The vehicle air conditioner according to claim 1, wherein a direction in which the first heat medium flows in the warm flow passage and a direction in which the second heat medium flows in the cold flow passage are opposite from each other.

5. The vehicle air conditioner according to claim 1, wherein
the seat comprises a plurality of seats provided in the vehicle interior;
each of the plurality of seats comprises a warm flow passage and a cold flow passage, and
the vehicle air conditioner further comprises:
a first total amount valve configured to adjust an amount of the first heat medium supplied from the high-temperature cycle to the plurality of seats; and
a second total amount valve configured to adjust an amount of the second heat medium supplied from the low-temperature cycle to the plurality of seats.

6. The vehicle air conditioner according to claim 1, wherein:
the seat comprises a plurality of seats provided in the vehicle interior;
each of the plurality of seats comprises a warm flow passage and a cold flow passage, and
the vehicle air conditioner further comprises:
first branch flow passages in which the warm flow passages are respectively provided;
second branch flow passages in which the cold flow passages are respectively provided;
first separate valves that are respectively provided in the first branch flow passages and configured to adjust a flow rate of the first heat medium supplied to the first branch flow passages; and
second separate valves that are respectively provided in the second branch flow passages and configured to adjust a flow rate of the second heat medium supplied to the second branch flow passages.

* * * * *